United States Patent
Liang et al.

(10) Patent No.: US 7,933,284 B2
(45) Date of Patent: Apr. 26, 2011

(54) METHOD AND APPARATUS FOR IMPROVING SIP SERVER PERFORMANCE

(75) Inventors: Zhi Yong Liang, Beijing (CN); Ling Shao, Beijing (CN); Hai Shan Wu, Beijing (CN); Wei Xue, Beijing (CN); Bo Yang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 12/079,680

(22) Filed: Mar. 28, 2008

(65) Prior Publication Data

US 2008/0253387 A1    Oct. 16, 2008

(30) Foreign Application Priority Data

Mar. 30, 2007   (CN) ............................ 200710091358

(51) Int. Cl.
    *H04L 12/56* (2006.01)
(52) U.S. Cl. ..................................................... 370/412
(58) Field of Classification Search .......... 370/412–419, 370/428, 429, 395.4, 395.41; 718/102–105; 713/503
    See application file for complete search history.

(56) References Cited

U.S. PATENT DOCUMENTS

| | | | |
|---|---|---|---|
| 6,608,813 B1 * | 8/2003 | Chiussi et al. ................ | 370/218 |
| 6,697,352 B1 | 2/2004 | Ludwig | |
| 6,987,768 B1 * | 1/2006 | Kojima et al. ................ | 370/401 |
| 7,046,680 B1 | 5/2006 | McDysan | |
| 7,050,447 B2 * | 5/2006 | Silverman et al. ........... | 370/412 |
| 7,058,064 B2 * | 6/2006 | Nemirovsky et al. ....... | 370/395.7 |
| 7,069,337 B2 | 6/2006 | Rawlins | |
| 7,096,261 B2 | 8/2006 | Abrol | |
| 7,177,276 B1 * | 2/2007 | Epps et al. .................... | 370/230 |
| 7,392,279 B1 * | 6/2008 | Chandran et al. ............ | 709/200 |
| 2002/0039368 A1 * | 4/2002 | Musoll et al. ................ | 370/412 |
| 2003/0123447 A1 * | 7/2003 | Smith ............................ | 370/394 |
| 2003/0198204 A1 | 10/2003 | Taneja | |
| 2004/0151197 A1 * | 8/2004 | Hui ................................ | 370/412 |
| 2004/0160971 A1 * | 8/2004 | Krause et al. ................ | 370/412 |
| 2004/0170186 A1 * | 9/2004 | Shao et al. .................... | 370/412 |
| 2005/0220115 A1 * | 10/2005 | Romano et al. ............ | 370/395.4 |
| 2006/0092972 A1 | 5/2006 | Petrovic | |
| 2007/0206621 A1 * | 9/2007 | Plamondon et al. ......... | 370/413 |
| 2008/0192764 A1 * | 8/2008 | Arefi et al. ................... | 370/412 |
| 2010/0088742 A1 * | 4/2010 | Wiryaman et al. ............ | 726/1 |

OTHER PUBLICATIONS

Han, et al, A Study on ACK Message Processing Mechanism in SIP Transaction Layer, pp. 632-635.
Wang, et al, "Applying PR-SCTP to Transport SIP Traffic", IEEE Globecom, pp. 776-780 (2005).

* cited by examiner

*Primary Examiner* — Chi H Pham
*Assistant Examiner* — Robert Lopata
(74) *Attorney, Agent, or Firm* — William Stock; Anne Vachon Dougherty

(57) ABSTRACT

A method and apparatus for improving SIP server performance is disclosed. The apparatus comprises an enqueuer for determining whether a request packet entering into the server is a new request or a retransmitted request and its retransmission times and for enqueuing the request packet into different queues based on results of the determining step and a dequeuer for dequeuing the packet in the queues for processing based on a scheduling policy. The apparatus may further include a policy controller for communicating with the server, enqueuer, dequeuer, queues and user, to dynamically and automatically set, or set based on the user's instructions, the scheduling policy, number of different queues, each queue's capacity, scheduling, etc. based on the network and/or server load and/or based on different server applications.

17 Claims, 6 Drawing Sheets

METHOD AND APPARATUS FOR IMPROVING SIP SERVER PERFORMANCE

TECHNICAL FIELD OF THE INVENTION

The present invention relates to SIP (Session Initiation Protocol) networks, and more particularly, to a method and apparatus for improving SIP server performance through dynamically classifying and scheduling SIP request packets.

BACKGROUND OF THE INVENTION

SIP is an application layer control (signaling) protocol for creating, modifying and terminating sessions with one or more participants. These sessions include Internet phone call, multimedia distribution and multimedia conference, etc. As a foundational session control protocol, SIP is becoming one of the standards in telecom NGN and IT collaborative solution. SIP protocol is a lightweight, transmission layer independent and text-based protocol, and although it has the advantages of being simple, human-readable etc, it brings significant burden on server side processing. Therefore, how to improve SIP server performance has become an important research subject of many enterprises and organizations including IBM.

Generally speaking, performance will cover throughput, latency, and other QoS related parameters. Throughput and latency are especially the top parameters for measuring the performance of a server system.

In the SIP protocol, retransmission is a basic approach to achieve the reliability of setting up sessions, especially when messages are transmitted over a connectionless protocol such as UDP, and/or the SIP server is heavy loaded.

The main approach to implement the SIP retransmission is by starting a timer when a request is sent out (it is not necessary to start a timer for a message to which no response is expected). When no response is received before the timer fires, then this message will be retransmitted. The retransmitted request will be retransmitted again if still no response is received within another timeout period. Generally, the delay to send the second retransmission is longer than that of the first time, usually with a double value. If no response has been received as yet, the retransmission will be repeated until certain threshold is reached, for example, the 7th retransmission fails. Request sending is aborted (call fails) at this moment. For details about retransmission mechanism, refer to RFC3261.

Current study has shown that retransmission contributes a lot to the average call setup latency, and hurts the throughput greatly. For example, if a message has been transmitted 5 times before a response is received successfully, the delay for this session will be at least the sum of the timeout periods of the first 4 retransmissions, which can be several seconds, or even dozes of seconds. This value can be thousands times larger than the delay of a successful session setup without retransmission (the typical value is several milliseconds). Besides, although 5 messages have been transmitted over the network (5 times traffic), only one session is set up. Thus, the throughput measured by the session setup rate can be rather low, together with a low efficiency of network bandwidth utilization.

FIG. 1 shows schematically the sending and retransmission process of a SIP request (for example, INVITE). As shown, after the client sends an initial request such as INVITE, if no response is received from the server, then the request is retransmitted at 500 ms. If still no response is received, then a $2^{nd}$ retransmission is performed, the delay of which is two times that of the $1^{st}$ retransmission, i.e. 1000 ms. The delay of the $3^{rd}$ retransmission is 2000 ms, and so forth. If a response is received after $5^{th}$ retransmission, e.g. 200 OK message, then the whole call setup latency is approximately the sum of the previous retransmission delays, that is, 15500 ms. This time is far greater than the call setup time without retransmission, generally several milliseconds.

In prior art, logically there is a queue on the SIP server side (since several queues or part of them can be seen as one queue) which does not know whether a message is a new request or a retransmission, or any other attributes of the message. Such a queue can be found in the TCP/IP stack, or in the java SIP stack which will be shipped with WAS. It should be noted that, the java SIP stack is modeled as having a queue with infinite capacity.

Since this queue cannot distinguish between a retransmitted request and a new request, the retransmitted request will just be treated as if it were also a new one. This "fair" processing will lead to performance penalty for the server.

Currently, there is work that attempts to remove redundant retransmissions on SIP proxy/server side, and there is also work that attempts to implement complicated classifier to achieve higher QoS for heavy-loaded SIP proxy/servers. However, these works have not distinguished between new SIP requests and retransmitted SIP requests and performed corresponding processing respectively, so they have not overcome the problems of SIP server throughput and latency.

Apparently, there is a need for a method and apparatus for improving the SIP server performance through dynamically classifying and scheduling SIP request packets.

SUMMARY OF THE INVENTION

The solution of the invention divides one queue into multiple queues, and provides an enqueuer (also referred to as dispatcher or classifier) with the capability to distinguish between new requests and retransmitted requests, and then enqueue messages into different queues, while a dequeuer (which is also a scheduler) behind the queues and before the SIP stack will dequeue the messages from the queues based on dynamic weights and send them to the SIP stack for processing.

In one aspect of the invention, there is provided a method for improving server performance, the method comprising the steps of: determining whether a request packet entering into the server is a new request or a retransmitted request; enqueuing said request packet into different queues based on the determination results; and dequeuing the packet in said queues for processing based on a scheduling policy.

In another aspect of the invention, there is provided an apparatus for improving server performance, the apparatus comprising: an enqueuer for determining whether a request packet entering into the server is a new request or a retransmitted request; and for enqueuing said request packet into different queues based on the determination results; and a dequeuer for dequeuing the packet in said queues for processing based on a scheduling policy. Preferably, the apparatus further comprises a policy controller for communicating with the server, enqueuer, dequeuer, queues and user, to dynamically and automatically set or set based on the user's instructions the scheduling policy, number of different queues and each queue's capacity etc. based on the network and/or server load and/or based on different server applications.

The present invention can also be implemented as a machine-readable program storage device comprising a storage medium for storing a program of instructions executable by said machine to perform all the steps of the foregoing method.

With the solution of the invention, performance (throughput and delay) can be improved with minor modification to server side and efficient but not complicated classification/scheduling (en-queue/de-queue) algorithms. The solution of the invention can achieve SIP protocol performance optimization without modification to the original SIP protocol stack. This is particularly advantageous when the source code of the SIP protocol stack is not available, or it is not allowed/feasible to modify it. The solution of the invention can dynamically and automatically adjust based on dynamic changes of network and server load, thus obtaining optimal configurations on the server side. The solution of the invention also provides server protection mechanisms such as security enhancement, anti-spam, etc. In addition, the solution of the invention can be implemented in a SIP appliance, which is especially useful when the server side SIP stack cannot implement this enhancement directly.

BRIEF DESCRIPTION OF THE DRAWINGS

The novel features believed characteristic of the invention are set forth in the appended claims. However, the invention itself and its preferred mode of use, additional objects and advantages will be best understood from the detailed description of the illustrative embodiments when read in conjunction with accompany drawings, in which:

DETAILED DESCRIPTION OF THE PREFERRED EMBODIMENTS

The embodiments of the invention will be described in the following with reference to the drawings. It should be noted that the described details are meant to sufficiently explain and illustrate the invention so that those skilled in the art can understand the essential ideas of the invention and can implement the invention, and are not meant to limit the invention. Furthermore, the various described features are not necessarily included in one embodiment of the invention, but can be included in different embodiments of the invention. The reference to each feature only means that the feature may appear in at least one embodiment of the invention. The present invention can be implemented without one or more described features. The invention can also be implemented with other features that are not described.

Hereinafter, the present invention is mainly described with reference to the SIP protocol and SIP server. However, although the SIP protocol and SIP server is indeed a main application field of the invention, the basic idea and technical solution of the invention is not limited thereto, and can be applied to other protocols and other servers. Briefly, all the network protocols that comprise a message retransmission mechanism and all the servers that use such a protocol can use the invention to improve their performance.

Figure 2:
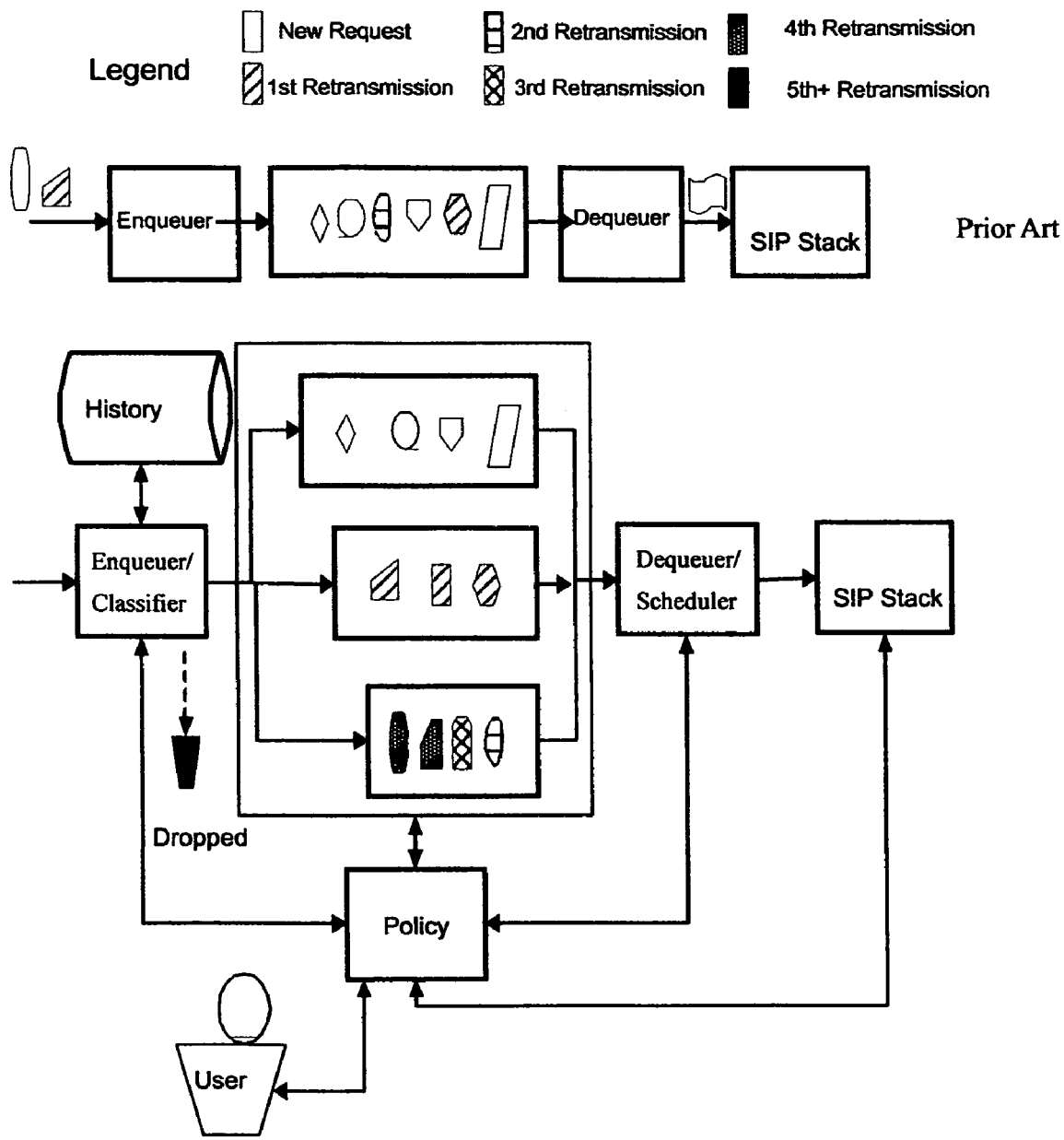
FIG. 2 is a schematic diagram illustrating an apparatus for improving server performance according to an embodiment of the invention and its comparison with an current enqueue/dequeue mechanism on the SIP server side.

FIG. 2 shows schematically an apparatus for improving server performance according to an embodiment of the invention and its comparison with a current enqueue/dequeue mechanism on the SIP server side.

As shown, in the prior art, an enqueuer on the SIP server side places new requests and requests of various times of retransmission coming from a SIP client into the same queue indiscriminately. And a dequeuer will fetch the new requests and requests of various times of retransmission from the queue in a first-in-first-out order, then place them into the SIP stack for processing.

On the contrary, the solution of the invention will reorganize the single queue in the prior art into multiple queues, each of which will be used to hold a specific kind of messages, for example, one queue for new request, one queue for request of 1st retransmission, one queue for request of 2nd retransmission, another queue for 3rd and more times of retransmission. It should be noted that the depicted and described number of queues and each queue's capacity is merely illustrative and is not limiting the invention. In other embodiments of the invention, there can be more or less queues, and each queue can be used to hold different kinds of messages.

Preferably, the number of queues and each queue's capacity can be set dynamically and automatically by a policy controller 203 described hereinafter based on the network and server load, or be set by user instructions.

As shown, an apparatus 200 for improving server performance according to an embodiment of the invention comprises: an enqueuer 201 for determining whether a request packet entering into the server is a new request or a retransmitted request and its retransmission times, and for enqueuing said request packet into different queues based on the determination results and an enqueuing policy; a dequeuer 202 for dequeuing packets in said queues for processing based on a scheduling policy; and a policy controller 203 for communication with the server, enqueuer, dequeuer, quequs and the user, to dynamically calculate and set the policies.

Wherein, enqueuer 201 is an enhancement to the enqueuer of the prior art and becomes a classifier, so as to have the ability to distinguish between new requests and retransmitted requests, and obtain details about retransmission times and other attributes. Preferably, enqueuer 201 distinguishes between new requests and retransmitted requests and determines the retransmission times by tracking the history of messages. This can be implemented, for example, by maintaining a hash table and recording retransmission times and other required attributes therein. Thus, whenever enqueuer 201 receives a request, it looks up in the hash table to see if the request is already in the table. If the request is not in the hash table, then it determines that the request is a new request, and stores the new request in the hash table, which is to be used to later determine retransmitted requests and their retransmission times. If the request is already in the hash table, then it determines that the request is a retransmitted request, and determines the retransmission times of that retransmitted request based on the retransmission times stored together with the corresponding request entry in the hash table, and then updates the stored retransmission times with the retransmission times of that retransmitted request. As is known to those skilled in the art, judging whether a request is a retransmission of an original request can be performed by, for example, extracting and comparing the transaction ID contained in the two requests.

Then, the enqueuer 201 dispatches the message into different queues based on the determination as to whether the message is a new request or a retransmitted request and its retransmission times, and based on a policy set by the policy controller 203.

The policy can be a dynamic policy and can be dynamically updated by policy controller 203 based on the network state, server load and administrator configurations.

It should be noted that, it is not necessary to hold messages with the same retransmission times in the same queue. Finer granularity of classification is supported in the invention. That is, messages with the same retransmission times but with other different attributes (for example, the type of session) can be enqueued into different queues. On the other hand, larger granularity of classification is also supported in the invention. For example, messages that are retransmitted 3 times or more can be put into the same queue.

In addition, in an embodiment of the invention, enqueuer 201 has the ability to drop directly some messages that are retransmitted too many times or some messages with attributes harmful to the server side according to the set policy, for example, the same message retransmitted rapidly that may represent a denial-of-service attack. The threshold of retransmission times used to determine when a message should be dropped and the disadvantageous attributes can be set by the user through policy controller 203.

The dequeuer 202 is an enhancement to the dequeuer of the prior art and becomes a scheduler, which will dequeue messages from the multiple queues based on a dynamic policy set by the policy controller 203. The policy can be any suitable scheduling policy, for example, round robin, weighted round robin etc.

It should be noted that, when a scheduling policy of weighted round robin is used, a queue to hold messages with larger retransmission times is not necessarily to have higher priority (weight). On the contrary, based on the scheduling policy and knowledge about SIP message processing, for example history knowledge, if the opportunity of a successful response becomes smaller for a message that is retransmitted more than certain times, the corresponding queue can just be set with a lower weight.

One extreme example is that, for a client not well implemented (or due to the interoperability problem), it can send some messages that are confusing/undesired/harmful to the server side. For example, although the server side SIP stack performs necessary operations, such as responding with a 4xx message (as is known to those skilled in the art, that kind of message indicates that the server believes that the received message comprises erroneous syntax or can not be processed in the server), the bad implementation of the client fails to do the necessary modifications and persists in using the original message format and content. In such a case, the enqueuer and dequeuer can be directed by the policy controller and work collaboratively to minimize its impact to the server side. For instance, the policy controller 203 can instruct dequeuer 202 to assign a lower scheduling priority to a queue that hold messages exceeding a threshold retransmission times, so as not to hinder the processing of new requests or requests with lower retransmission times, with higher scheduling priorities and which are more likely to get successful responses, and can further instruct enqueuer 201 to drop directly messages that exceeds another threshold retransmission times.

The policy controller 203 communicates with the enqueuer 201, dequeuer 202, queues, SIP stack (server) and user, and its main function is to obtain and calculate the information about the network load and server load, information about the application server and other relevant information, determine various policies based on the obtained information and on user inputted instructions, including the policy about setting the number and capabilities of the queues, the enqueuer's enqueuing policy and dropping policy, the dequeuer's scheduling policy etc., and apply the determined policies to the queues, dequeuer and enqueuer. The various policies are dynamic policies, that is, they can be dynamically calculated and changed by the policy controller based on its information exchange with other entities (e.g., the enqueuer, dequeuer, server, queues and user), for example, based on the network state, server load (such as CPU consumption, storage consumption) etc. For example, when the network is busy so that packet loss is high due to network congestion, the policy controller 203 can assign larger capacity to queues, or can assign larger weights to queues holding retransmitted request packets with larger retransmission times, or increase the threshold for dropping retransmitted request packets with too large retransmission times, so as to give larger processing opportunity to retransmitted request packets with larger retransmission times. In contrast, when the server is busy so that packet loss is high due to server overload, the policy controller 203 can assign smaller capacity to queues, or can assign smaller weights to queues holding retransmitted request packets with larger retransmission times, or decrease the threshold for dropping retransmitted request packets with too large retransmission times, so as to accelerate the server side's processing of request packets at the cost of retransmitted request packets with larger retransmission times. When both network and server are busy at the same time, the dynamic policy employed when only server is busy can be used, because the server is the device that ultimately decides the processing ability.

The policy controller 203 according to the invention not only can classify messages based on whether the message represent a new request or a retransmitted request and perform enqueuing and scheduling respectively, but also can classify messages further based on the type (e.g., media type) of the session to be established by the message and perform enqueuing and scheduling respectively. For example, if an application requires several sessions to get to work, for example, a conferencing application will negotiate audio, video and remote operation sessions respectively, the solution of the invention can be set to support negotiating the main session (e.g., the audio session in this example) more quickly. That is, the policy controller 203 according to the invention can make enqueuer 201 enqueue requests to establish audio, video and remote operation sessions to different queues, and make dequeuer 202 give a larger priority to messages in the audio queue when scheduling.

The apparatus for improving SIP server performance according to an embodiment of the invention has been described above, it should be noted that, what is depicted and described is only an illustrative embodiment of the invention and is not meant to limit the invention. For example, the queue refers to a logical queue, which may comprise a single physical queue, or may comprise a plurality of physical queues and its component may be separate from each other. The queues and the enqueuer 201, dequeuer 202 and policy controller 203 can either lie at the application layer, or lie at the transmission layer or media layer such as on a network interface card, or lie between these layers, in which case, the dequeuer 202 will not communicate with the SIP stack directly. In addition, the policy controller 203 can be either a single entity, or multiple entities, and some or all of its functions can either be realized by a separate entity, or be realized by other entities such as the enqueuer 201 and dequeuer 202.

Figure 3:
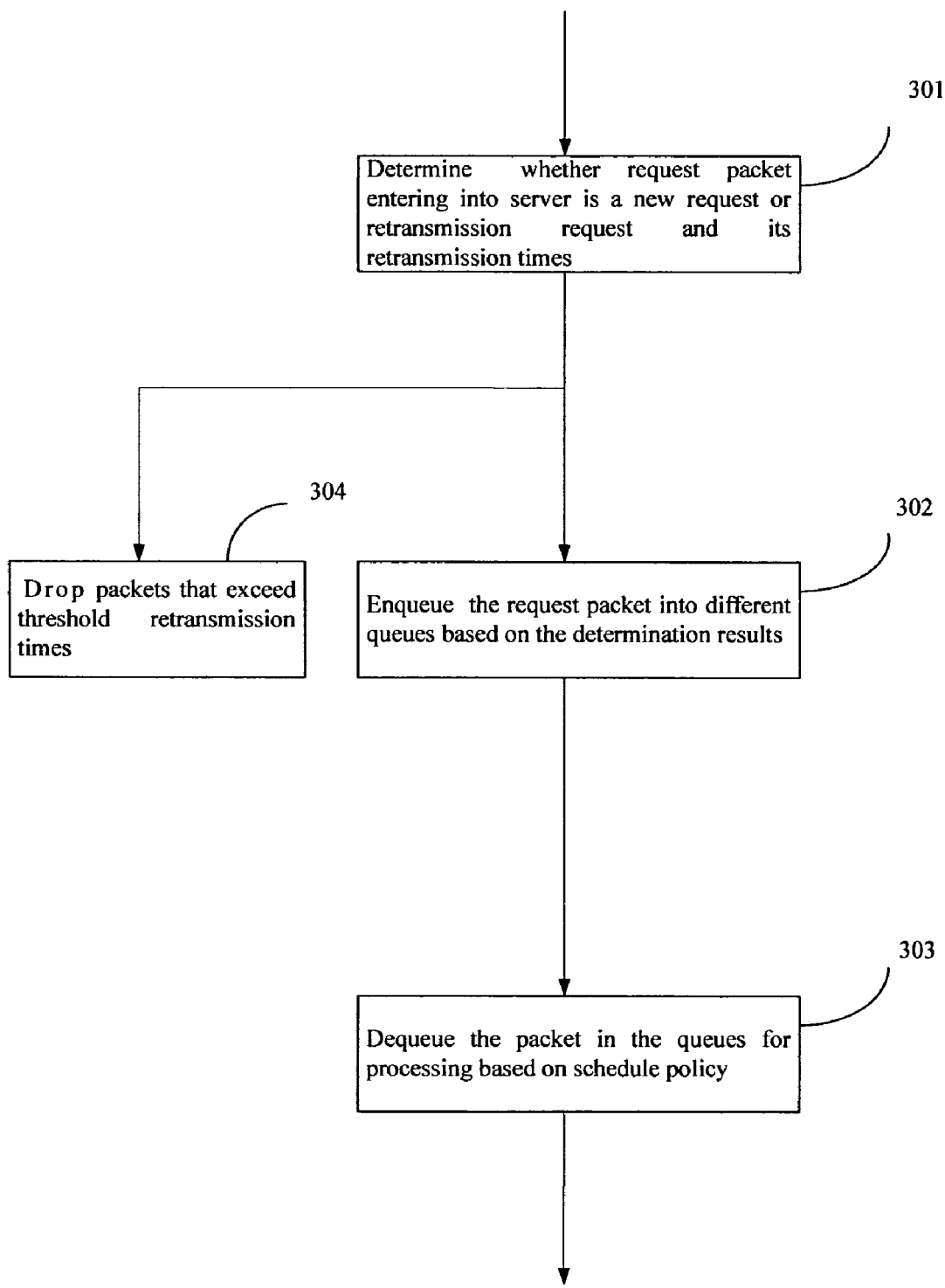
FIG. 3 is a flowchart depicting a method for improving server performance according to an embodiment of the invention.

Next, a method for improving server performance according to an embodiment of the invention will be described with reference to FIG. 3. As shown in FIG. 3, the method for improving server performance according to an embodiment of the invention comprises the following steps:

In step 301, it is determined whether a request packet entering into the server is a new request or a retransmitted request and its retransmission times. As can be understood by those skilled in the art, such determination can be realized by maintaining the history information regarding previous requests on the server side and comparing the received request with the history information. Specifically, just as an example, for each received request packet, a transaction ID uniquely identifying the request is extracted therefrom. A hash table is maintained in the server, which hash table stores therein the transaction ID of each previous request and the corresponding retransmission times. The transaction ID extracted from the current request packet is looked up in the hash table, if it is not found, this indicates that the request is a new request, and the transaction ID of the new request is stored in the hash table, and the value of its corresponding retransmission times is set to 0 for the determination of subsequent requests. If the transaction ID is found in the hash table, this indicates that the request is a retransmitted request and the corresponding retransmission times is extracted from the hash table. The retransmission times is added by 1, generating the retransmission times of the current request packet. And the stored retransmission times is updated with this current retransmission times. Of course, the above-described method for determining whether a request packet entering into the server is a new request or a retransmitted request and its retransmission times is merely an example and is not limiting the invention. Any prior art method or method to be developed in the future for making such determination as will occur to those skilled in the art can be applied to the invention.

In an embodiment of the invention, the request packet entering into the server is a SIP request, and especially, a session establishment request INVITE. However, the request packet may also be other SIP requests, such as ACK, OPTIONS, BYE, CANCEL etc. Furthermore, the invention is also applicable to non-SIP protocols that comprise retransmission mechanism, such as the HTTP protocol, and in which case, the request packet will be a HTTP request packet. In addition, the invention is not only applicable to the application layer, but also applicable to lower layers such as the transmission layer or media layer, and in which case, the request packet refers to a request packet of a lower layer.

In step 302, the request packet is enqueued into different queues based on the determination result and enqueuing policy. That is, the request packet is enqueued into a queue for that request or a queue for retransmitted requests with that retransmission times based on the determination as to whether the request packet is a new request or a retransmitted request, and if it is a retransmitted request, the determination as to its retransmission times, in order to subsequently perform respective scheduling and processing on new requests and retransmitted requests and retransmitted requests with different retransmission times.

The number of the queues and each queue's capacity may vary. For example, there may be four queues, one queue for holding new requests, another queue for holding requests of $1^{st}$ retransmission, still another queue for holding requests of $2^{nd}$ retransmission, the last queue for holding requests of $3^{rd}$ and more times of retransmission. There may also be three queues, one queue for holding new requests, another queue for holding requests of $1^{st}$ and $2^{nd}$ retransmission, still another queue for holding requests of $3^{rd}$ and more times of retransmission. In a preferred embodiment of the invention, the number of queues and each queue's capacity and the enqueuing policy is configurable by the user, or as described above, can be set dynamically by the system based on the load state of the network and server, type of the application server, etc.

The length of the queue can be same or different. The queues refer to logical entities and are not necessarily corresponding to individual physical queues, instead, they can comprise multiple separate physical queues. The queues can either lie at the application layer, or lie at a lower layer such as the transmission layer or media layer, or can comprise physical queues at different layers.

In addition to placing a request packet into different queues based on whether it is a new request or a retransmitted request and its retransmission times, the request packet can be placed into different queues further based on other attributes of the request packet. For example, the request packet can be placed into different queues based on the type of the session to be established by the request packet. More particularly, for instance, the session establishment requests for audio, video and remote operations belonging to the same meeting application can be enqueued into different queues to give different scheduling priorities to them, such as giving a higher scheduling priority to the queue that holds audio session establishment requests, so as to negotiate and establish an audio session as soon as possible.

In step 303, packets in the queues are dequeued for processing based on a scheduling policy. The scheduling policy can give different scheduling priorities to request packets in different queues. In a preferred embodiment of the invention, the scheduling policy is that of Weighted Round Robin (WRR), that is, packets in the queues are processed in turn, but for a queue with larger weight, more packets will be processed at one time, while for a queue with smaller weight, less packets will be processed at one time. Wherein, the value of each queue's weight can be set by the user, or can be dynamically and automatically set by the system based on the load state of the network and server, type of the application server, etc. Of course, the scheduling policy can also be any other suitable existing scheduling algorithm such as round robin or a scheduling algorithm to be developed in the future.

In a preferred embodiment of the invention, the scheduling policy includes to give a lower scheduling priority to the retransmission packets in a queue that holds retransmission packets exceeding a set threshold retransmission times. In case the Weighted Round Robin is used, that is to give a lower weight to the retransmission packets in a queue that holds retransmission packets exceeding a set threshold retransmission times. The threshold can be set by the user, or can be set dynamically and automatically by the system based on the load state of the network and server, type of the application server, etc. Thus, those requests that are unlikely to be successfully responded to due to having too large retransmission times will consume less server resources, so that the server resources can be saved to process tasks that are more likely to be successful, such as new requests.

In a preferred embodiment of the invention, the method for improving server performance further comprises step 304, wherein request packets that exceed another threshold retransmission times will be directly dropped without being placed into any queues. This can become an enhanced security and server protection mechanism to protect against the situation where those clients not well implemented send the same requests repeatedly and where a malicious client sends spam information. Preferably, the threshold may also be set by the user or can be set dynamically and automatically by the system based on the load state of the network and server, type of the application server, etc.

The various steps of the method for improving server performance according to an embodiment of the invention having been described above, it should be noted that the described and depicted steps are only illustrative of the method of the invention, and are meant to enable those skilled in the art to fully understand and implement the invention and are not meant to limit the invention. The method for improving server performance of the invention can have more, fewer or different steps as compared to what has been described. The order of some steps may change, some steps can be performed concurrently, and all of these changes are within the spirit and scope of the invention.

In addition, although the above method and steps are described mainly with reference to a SIP server and its SIP protocol stack that process SIP request messages, it will occur to those skilled in the art that, the basic idea and technical solution of the invention will also apply to other servers that utilize other protocols.

Additionally, the above described method for improving server performance according to an embodiment of the invention can either be performed by the foregoing apparatus for improving server performance according to an embodiment of the invention, or can be performed by another apparatus.

The invention can also be implemented as a machine-readable program storage device tangibly embodying a program of instructions executable by the machine to perform all the steps of the foregoing method for improving server performance.

An exemplary implementation of the invention is given below to more specifically describe and illustrate the technical solution of the invention and its benefits.

Figure 4:
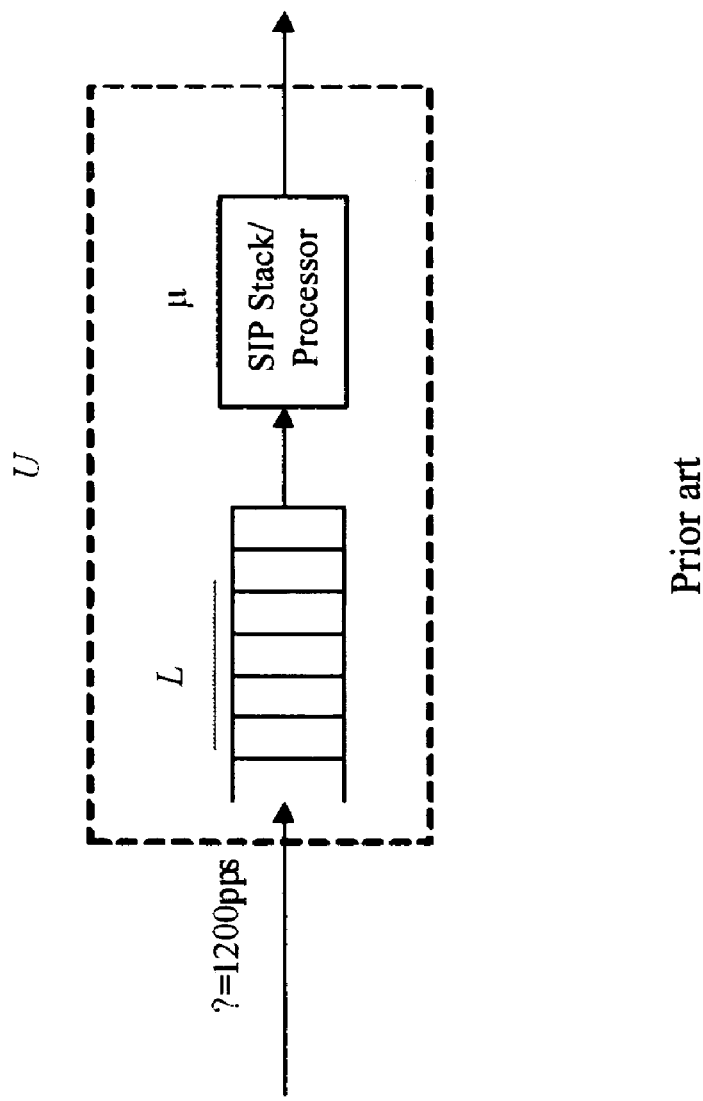
FIG. 4 is a schematic diagram of a model of a prior art system.

FIG. 4 depicts an exemplary model of a prior art system. As shown, the system comprises a queue with length L, and a SIP message processor with the processing rate of μpps (Packer Per Second). $\lambda$ is the packet arriving rate. U represents the number of packets that are waiting for or under processing per second. Thus:

$$U = L + \mu.$$

The average message processing latency can be calculated by the following weighted equation:

$$T = \frac{T_0 N_0 + T_1 N_1 + T_2 N_2 + \ldots + T_j N_j}{N_0 + N_1 + \ldots + N_j} \text{ ms}$$

Here, j represents the jth (0, 1st, 2nd, 3rd, . . . ) retransmitted SIP messages. $N_j$ represents the number of packets that are successfully transmitted on the jth retransmission, $T_j$ represents the latency used by a packet that is successfully transmitted on the jth retransmission.

Assume L=90, μ=900 pps, U=L+μ=990 pps. The packet processing delay is assumed to be 1 ms, which is the typical time between the response and the request.

Within one second, $\lambda$=1200 pps. Assume these 1200 packets comprise 1000 new SIP messages, 50 1st retransmitted SIP messages, 50 2nd retransmitted SIP messages and 100 3rd retransmitted SIP messages. Since U=990 pps, there will be 210 packets being lost in this second.

With a prior art system, assuming there are 110 new SIP messages, 50 1st retransmitted SIP messages and 50 2nd retransmitted SIP messages being lost at this moment, we can get the following conclusion:

$$T_{origin} = \frac{(1000 - 110) \times 1 + 100 \times (3500 + 1)}{(1000 - 110) + 100} = 354.54 \text{ ms}$$

Figure 1:
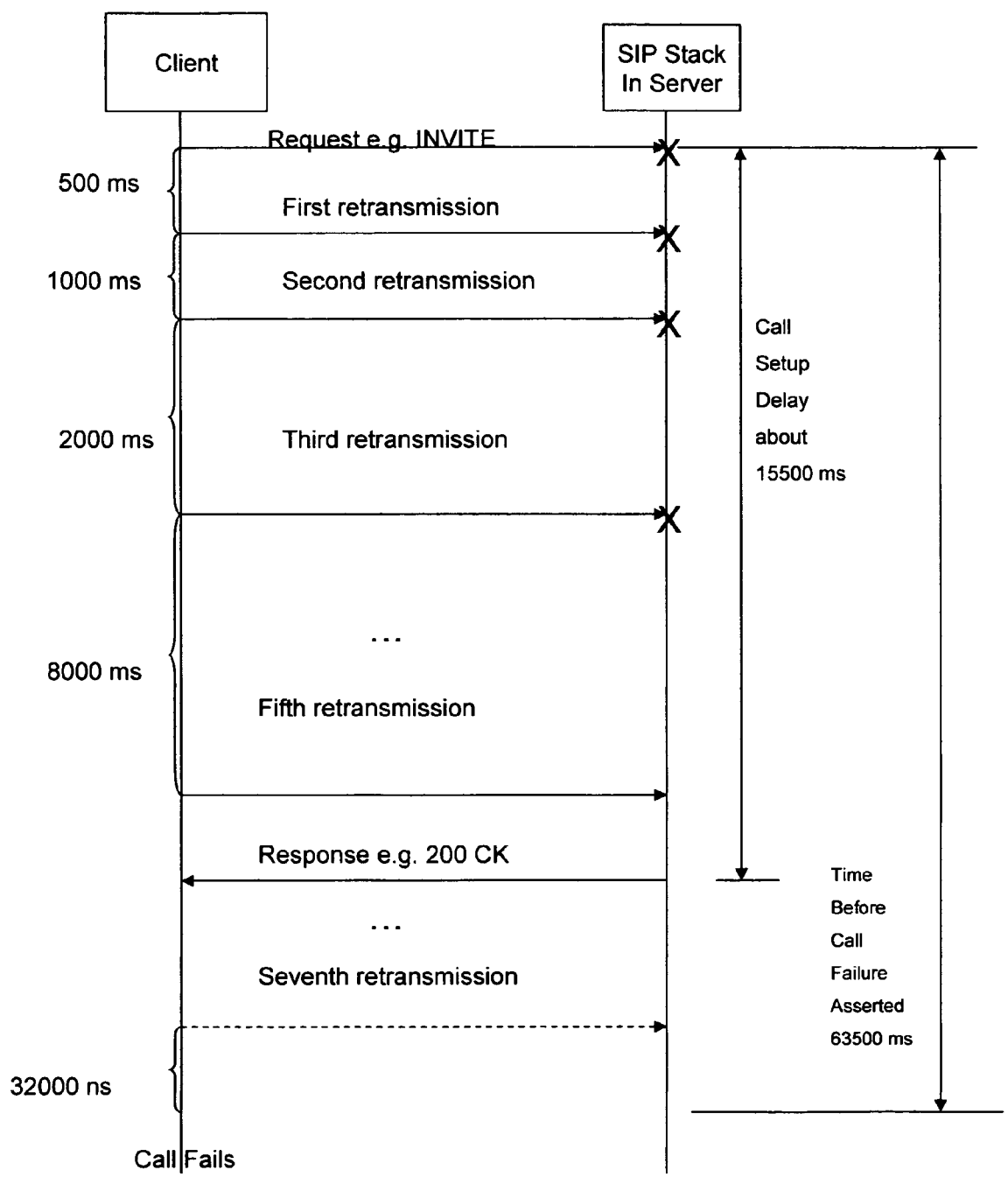
FIG. 1 is a schematic diagram of sending and retransmission process of a SIP request (for example, INVITE)

In the above equation, "1000−110" represents the number of new messages that are successfully responded to, "100" represents the number of $3^{rd}$ retransmitted messages that are successfully responded to, "1" represents that the delay used to transmit "1000−110" new messages and get the response is 1 ms, "3500+1" represents that the delay used to transmit "100" $3^{rd}$ retransmitted messages and get the response is "3500+1" ms. The delay for a $3^{rd}$ retransmitted message to get the response is the sum of the delay to process a new message (1 ms), the retransmission interval of $1^{st}$ retransmitted message (500 ms), the retransmission interval of $2^{nd}$ retransmitted message (1000 ms), and the retransmission interval of $3^{rd}$ retransmitted message (2000 ms). Reference can be made to FIG. 1 for the retransmission interval of a retransmitted message.

Figure 5:
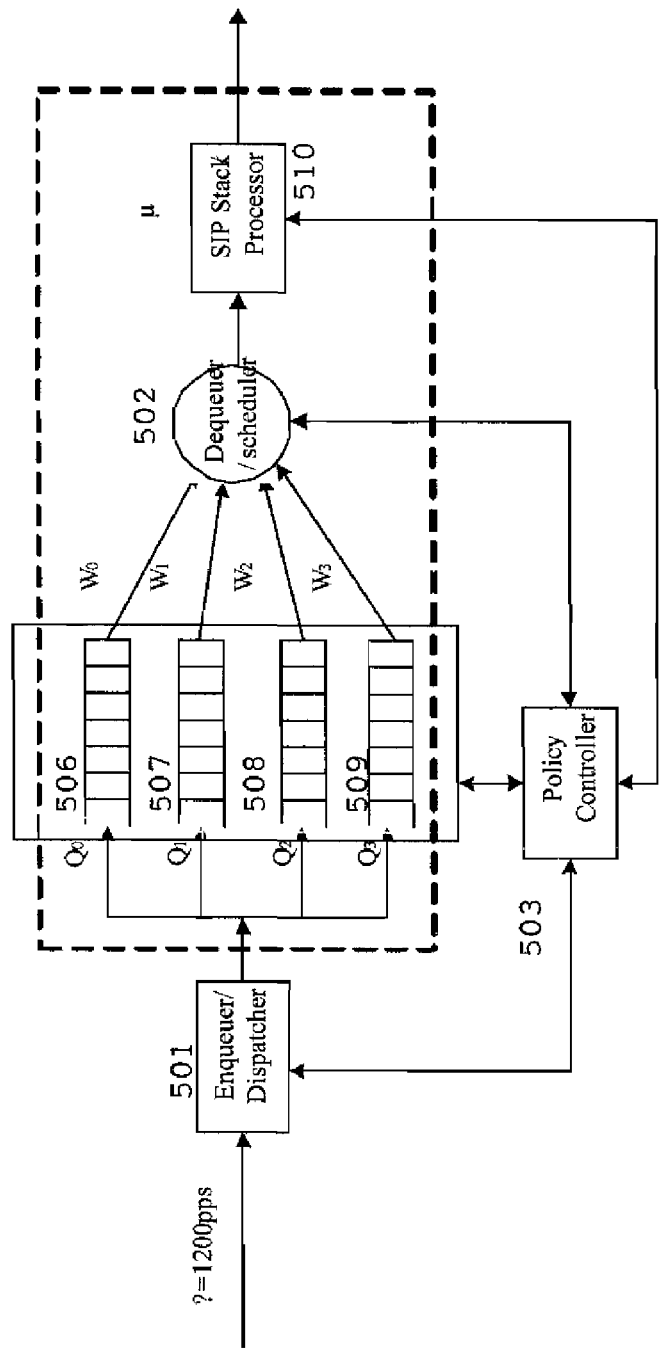
FIG. 5 is a schematic diagram of a model of a system in which the present invention has been applied.

FIG. 5 shows a system that has applied the invention, in which there are 4 queues, 506-509, with $W_i$ as the weight respectively. A WRR (Weight Round Robin) like policy is used for scheduling. The algorithm is implemented by the policy controller 503 as follows: the enqueuer 501 will queue messages, give an integer $W_i$ as the weight to each queue i, and the dequeuer 502 will remove $W_i$ messages from each queue before moving to the next queue. That is to say, the packets in a queue with higher $W_i$ will have more chance to be processed at the SIP stack processor 510.

Again, the average message processing latency is $$T = \frac{T_0 N_0 + T_1 N_1 + T_2 N_2 + \ldots + T_j N_j}{N_0 + N_1 + \ldots + N_j} \text{ ms}.$$

Wherein, j represents the $j^{th}$ ($0^{th}$, $1^{st}$, $2^{nd}$, $3^{rd}$, . . . ) retransmitted SIP messages.

Again, assume L=90, μ=900 pps, U=L+μ=990 pps, the packet processing delay is approximates 1 ms.

Within one second, $\lambda$=1200 pps. Assume these 1200 packets include 1000 new SIP messages, 50 1st retransmitted SIP messages, 50 2nd retransmitted SIP messages and 100 3rd retransmitted SIP messages. Since U=990 pps, there will be 210 packets being lost at this second.

Further assume that the weight of queue $Q_0$ for new SIP messages is $W_0$=20, the weight of queue $Q_1$ for 1st retransmitted SIP messages is $W_1$=10, the weight of queue $Q_2$ for 2nd retransmitted SIP messages is $W_2$=10, the weight of queue $Q_3$ for 3rd retransmitted SIP messages is $W_3$=1.

Table 1 shows the execution of the WRR algorithm at this moment:

TABLE 1

| Round | $Q_0$ Post-service | $Q_0$ Current service | $Q_1$ Post-service | $Q_1$ Current service | $Q_2$ Post-service | $Q_2$ Current service | $Q_3$ Post-service | $Q_3$ Current service |
|---|---|---|---|---|---|---|---|---|
| 1 | 980 | 20 | 40 | 10 | 40 | 10 | 99 | 1 |
| 2 | 960 | 20 | 30 | 10 | 30 | 10 | 98 | 1 |
| 3 | 940 | 20 | 20 | 10 | 20 | 10 | 97 | 1 |
| 4 | 920 | 20 | 10 | 10 | 10 | 10 | 96 | 1 |
| 5 | 900 | 20 | 0 | 10 | 0 | 10 | 95 | 1 |
| 6 | 880 | 20 | 0 | 0 | 0 | 0 | 94 | 1 |
| . | . | . | . | . | . | . | . | . |
| . | . | . | . | . | . | . | . | . |
| 42 | 160 | 20 | 0 | 0 | 0 | 0 | 58 | 1 |
| 43 | 152 | 8 | 0 | 0 | 0 | 0 | 58 | 0 |
| Sum | | 848 | | 50 | | 50 | | 42 |

In Table 1, "Round" is used to represent each round of the WRR algorithm, $Q_0$, $Q_1$, $Q_2$, $Q_3$ represent each queue respectively, "post-service" represents the number of packets remaining in the queue after this round of service. "Current service" represents the number of packets in the queue processed by this round of service. It can be seen from the table that, in first round, queue $Q_0$ is served first, and since its weight is 20, dispatcher will turn to service queue $Q_1$ only after 20 packets in queue $Q_0$ have been processed. Similarly, there will be 10 packets in $Q_1$ to be processed, and so forth. After the first round execution of the WRR algorithm, there are 980, 40, 40, 99 packets remaining in $Q_0$, $Q_1$, $Q_2$, $Q_3$ respectively. According to this algorithm, when the 43th round is to be executed, there are 160 packets remaining in queue $Q_0$, 0 packet remaining in queue $Q_1$ and $Q_2$, and 58 packets remaining in queue $Q_3$. By this time, the system has served 982 packets and only 8 packets can be processed. Therefore, in the 43th round, 8 packets in queue $Q_0$ will be processed, and the remaining 152 packets will all be dropped. And all the remaining 58 packets in Q3 will also be dropped. That is, there are 152 new SIP messages and 58 3rd retransmitted SIP messages being lost in this second. So, $$T_{WithSch} = \frac{(1000-152) \times 1 + 50 \times (500+1) + 50 \times (1500+1) + (100-58) \times (3500+1)}{(1000-152) + 50 + 50 + (100-58)}$$
$$= 250.49 \text{ ms}$$

Thus, based on the above assumption, the performance gain with the present invention in delay reduction is:

$$\frac{T_{origin} - T_{WithSch}}{T_{origin}} = \frac{354.54 - 250.49}{354.54} = 29.35\%$$

That is, the present invention reduces the latency by 29.35% with the above assumptions.

The comparison between the performances of the prior art system and the system of the invention under different weight and packet loss rate conditions is given below.

(1) Assume that λ=10000 pps. These 10000 packets comprise 9000 new SIP messages, 100 1st retransmitted SIP messages, 100 2nd retransmitted SIP messages and 800 3rd retransmitted SIP messages;

(2) Assume that Packet loss rate (P) is 0.1%, 1%, 5% and 10% respectively for better evaluating the performance under different packet loss rates;

(3) In order to evaluate the impact of weights in the WRR algorithm, two sets of weights are chosen for better comparison. The two sets of weights for a system of the present invention are:

$W = \{W_0, W_1, W_2, W_3\} = \{20, 10, 10, 1\}$ and $W' = \{W'_0, W'_1, W'_2, W'_3\} = \{50, 20, 20, 1\}$ W' has higher weights for $Q_0$, $Q_1$ and $Q_2$. That is to say, more chance are given to serve packets in these queues in W'.

When P=0.1%, 10 (10=10000 packets×0.1%) messages will be lost in one second. With the prior art system, assume that there are 9 new SIP messages and 1 3rd retransmitted message being lost at this moment. So we can have:

$$T_{origin\_0.1\%} = \frac{(9000-9) \times 1 + 100 \times (500+1) + 100 \times (1500+1) + (800-1) \times (3500+1)}{(9000-9) + 100 + 100 + (800-1)}$$
$$= 300.9 \text{ ms}$$

With W in present invention, according to the WRR algorithm, there are 10 3rd retransmitted SIP messages being lost at this moment. So we can have:

$$T_{W\_0.1\%} = \frac{9000 \times 1 + 100 \times (500+1) + 100 \times (1500+1) + (800-10) \times (3500+1)}{9000 + 100 + 100 + 50 + (800-10)}$$
$$= 297.8 \text{ ms}$$

With W' in present invention, according to the WRR algorithm, there are also 10 3rd retransmitted SIP messages being lost at this moment. So we can get that:

$$T_{W\_0.1\%} = \frac{9000 \times 1 + 100 \times (500+1) + 100 \times (1500+1) + (800-10) \times (3500+1)}{9000 + 100 + 100 + 50 + (800-10)}$$
$$= 297.8 \text{ ms}$$

That is to say, the performance gain with W in present invention in delay reduction is:

$$\frac{T_{origin\_0.1\%} - T_{W\_0.1\%}}{T_{origin\_0.1\%}} = \frac{300.9 - 297.8}{300.9} = 1.03\%$$

And the performance gain with W' in present invention in delay reduction is also 1.03%.

Table 2-4 shows the number of each kind of messages lost under different conditions.

TABLE 2 prior art system

| P | New Message | $1^{st}$ retransmitted Message | $2^{nd}$ retransmitted Message | $3^{rd}$ retransmitted Message |
| --- | --- | --- | --- | --- |
| 0.1% | 9 | 0 | 0 | 1 |
| 1% | 90 | 1 | 1 | 8 |
| 5% | 450 | 5 | 5 | 40 |
| 10% | 900 | 10 | 10 | 80 |

TABLE 3

System of the invention with W

| P | New Message | $1^{st}$ retransmission Message | $2^{nd}$ retransmission Message | $3^{rd}$ retransmission Message |
| --- | --- | --- | --- | --- |
| 0.1% | 0 | 0 | 0 | 10 |
| 1% | 0 | 0 | 0 | 100 |
| 5% | 142 | 0 | 0 | 358 |
| 10% | 620 | 0 | 0 | 380 |

TABLE 4

System of the invention with W'

| P | New Message | $1^{st}$ retransmission Message | $2^{nd}$ retransmission Message | $3^{rd}$ retransmission Message |
| --- | --- | --- | --- | --- |
| 0.1% | 0 | 0 | 0 | 10 |
| 1% | 0 | 0 | 0 | 100 |
| 5% | 0 | 0 | 0 | 500 |
| 10% | 372 | 0 | 0 | 628 |

Figure 6:
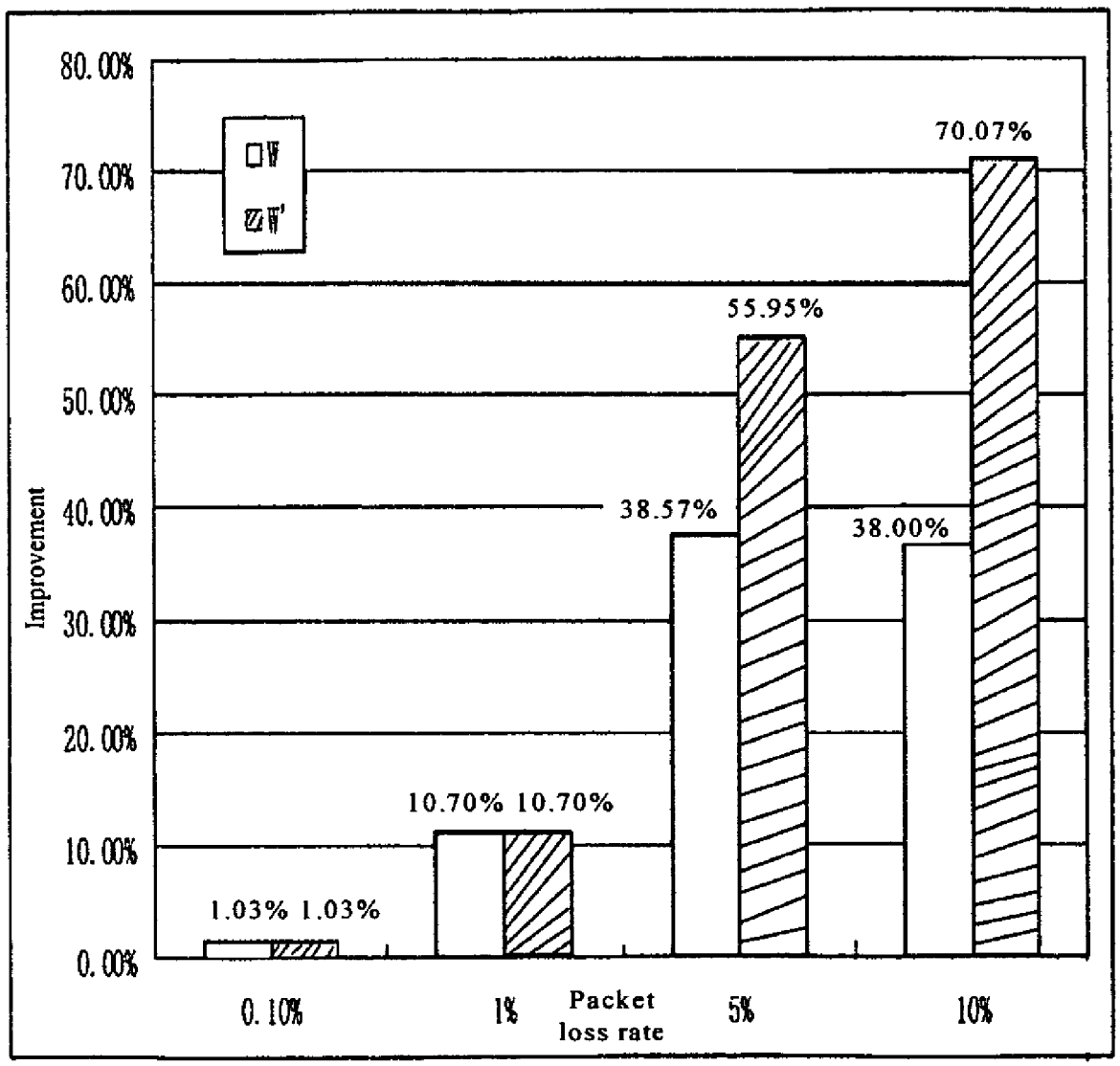
FIG. 6 is an illustration of the performance gain of the system according to the invention over a prior art system in delay reduction under different weight and packet loss rate conditions.

FIG. 6 illustrates the performance gain of the system according to the invention over a prior art system in delay reduction under different weights and packet loss rate conditions. It can be seen from the results that a remarkable performance gain can be obtained with the system of the invention when packet loss rate is higher. Also, W' has a better performance than W. That is because with higher weights in $Q_0$, $Q_1$ and $Q_2$, these three queues will have more chance to be served. Packets in these three queues are those with less or even no retransmission times. In one second, more packets with less or even no retransmission times will be processed in the system with W' than the system with W. So, under the same packet processing rate per second (or packet loss rate per second), $T_{W'} < T_W < T_{origin}$. Based on this conclusion, weight of each queue can be changed according to the response time of each service and the content of each queue.

The method, apparatus of the invention and their examples have been described above. The present invention can be implemented in hardware, software, firmware or any combination thereof. A typical combination of hardware and software may be a general-purpose computer system with a computer program, which when being loaded and executed, will control the computer system to execute the method described herein. Thus the general-purpose computer system under the control of the program constitutes the apparatus of the invention. The method and apparatus of the invention can either be implemented in a SIP appliance, or be implemented in a SIP proxy, or be implemented in a SIP server and SIP proxy in a distributed manner. The method and apparatus of the invention can either be implemented in the application layer, or be implemented in the transmission layer or media layer, or be implemented in multiple layers, or be implemented between the layers. All of these variations are within the scope of the invention.

In addition, it should be understood that, as an alternative, at least some aspects of the invention can be implemented in a program product. The program defining the functions of the invention can be transmitted to a data storage system or computer system via various types of signal bearing media including, but not limited to, non-writable storage media (such as CD-ROM), writable storage media (such as diskette, hard disk drive, read/write CD, optical media) and communication media such as computer and telephone network including Ethernet. Therefore, it should be understood that, such signal bearing media, when bearing or encoding the computer readable instructions directing the method functions of the invention, represents another alternative embodiment of the invention.

Although the present invention has been particularly shown and described with reference to preferred embodiments of the invention, those skilled in the art should understand that various changes can be made thereto both in form and details without departing from the spirit and scope of the invention.

The invention claimed is:

1. A method for improving server performance, comprising the steps of:
   determining whether a request packet entering into a server is a new request or a retransmitted request;
   enqueuing said request packet into different queues based on results of the determining step; and
   dequeuing the packet in said queues for processing based on a scheduling policy,
   wherein said determining step further comprises determining retransmission times of said retransmitted request; and said enqueuing step further comprises enqueuing said request packet into different queues based on the determined retransmission times.

2. The method according to claim 1, wherein said scheduling policy employs a Weighted Round Robin method.

3. The method according to claim 2, wherein said scheduling policy comprises giving a lower scheduling priority to a queue containing retransmitted packets when the retransmission times exceed a first threshold.

4. The method according to claim 1, further comprising dropping a retransmitted packet when the retransmission times exceed a second threshold.

5. The method according to claim 1, wherein said determining step comprises:
   maintaining history information regarding request packets previously entering into the server on the server side; and
   performing said determination by comparing said request packet entering into the server with said history information.

6. The method according to claim 1, further comprising the steps of:
- ascertaining a type of session to be established by the request packet entering into the server; and
- enqueuing said request packet into different queues based on the results of said determining and said ascertaining.

7. The method according to claim 1, further comprising the steps of, based on at least one of network load, server load, and different server applications, setting one or more of the number of said different queues, each queue's capacity, and said scheduling policy.

8. The method according to claim 4 further comprising the steps of, based on at least one of network load, server load, and different server applications, setting one or more of the number of said different queues, each queue's capacity, said scheduling policy and said second threshold.

9. An apparatus for improving server performance, comprising:
- a processor for executing:
  - an enqueuer for determining whether a request packet entering into a server is a new request or a retransmitted request;
  - and for enqueuing said request packet into different queues based on results of the determining; and
  - a dequeuer for dequeuing the packet in said queues for processing based on a scheduling policy,
- wherein said enqueuer is further configured to determine retransmission times of said retransmitted request, and enqueue said request packet into different queues based on the determined retransmission times.

10. The apparatus according to claim 9, wherein said scheduling policy employs a Weighted Round Robin method.

11. The apparatus according to claim 10, wherein said scheduling policy comprises giving a lower scheduling priority to a queue containing retransmitted packet when the retransmission times exceed a first threshold.

12. The apparatus according to claim 9, wherein said enqueuer is further configured to drop a retransmission packet whose retransmission times exceed a second threshold.

13. The apparatus according to claim 9, wherein said enqueuer performs said determination by comparing said request packet entering into the server with history information regarding request packets previously entering into the server maintained on the server side.

14. The apparatus according to claim 9, wherein said enqueuer is further configured to:
- ascertain a type of the session to be established by the request packet entering into the server; and
- enqueue said request packet into different queues based on results of the determining and ascertaining.

15. The apparatus according to claim 9, further comprising a policy controller, which, based on at least one of network load, server load, and different server applications, sets at least one of a number of said different queues, each queue's capacity and the scheduling policy.

16. The apparatus according to claim 12, further comprising a policy controller, which, based on at least one of network load, server load, and different server applications, sets at least one of a number of said different queues, each queue's capacity, the scheduling policy and the second threshold.

17. A non-transitory machine-readable program storage medium device storing a program of instructions executable by said machine to perform a method for improving server performance, said method comprising the steps of:
- determining whether a request packet entering into a the server is a new request or a retransmitted request;
- enqueuing said request packet into different queues based on results of the determining step; and
- dequeuing the packet in said queues for processing based on a scheduling policy;
- wherein said determining step further comprises determining retransmission times of said retransmitted request; and said enqueuing step further comprises enqueuing said request packet into different queues based on the determined retransmission times.

* * * * *